US006169929B1

United States Patent
Izzo et al.

(10) Patent No.: US 6,169,929 B1
(45) Date of Patent: Jan. 2, 2001

(54) AUTOMATIC POLLING FOR USER INTERRUPTS IN A PROGRAMMABLE CONTROLLER USING RELAY LADDER LOGIC

(75) Inventors: Joseph P. Izzo, New Berlin; Steven L. Whitsitt, Waukesha, both of WI (US)

(73) Assignee: Rockwell Technologies, LLC, Thousand Oaks, CA (US)

(*) Notice: Under 35 U.S.C. 154(b), the term of this patent shall be extended for 0 days.

(21) Appl. No.: 09/189,175

(22) Filed: Nov. 10, 1998

(51) Int. Cl.[7] .............................. G06F 9/06; G06F 15/76; G05B 19/00
(52) U.S. Cl. ................... 700/18; 710/1; 710/263; 710/262; 710/220; 712/32
(58) Field of Search .................. 700/18, 7, 11; 710/5, 263, 1, 266, 262, 264, 220; 712/203, 32, 245; 713/502; 702/176; 709/107; 711/100

(56) References Cited

U.S. PATENT DOCUMENTS 4,021,783 * 5/1977 Highberger .
4,972,365 * 11/1990 Dodds et al. .
5,295,059 * 3/1994 Brooks et al. .

* cited by examiner

Primary Examiner—Gopal C. Ray
(74) Attorney, Agent, or Firm—John J. Horn; William R. Walbrun; John M. Miller

(57) ABSTRACT

A programmable controller includes memory for storing a ladder logic control program having a plurality of ladder logic instruction rungs. Each rung begins with a start of rung (SOR) instruction. A processor is coupled to the memory for executing the ladder logic control program. User interrupts are disabled during execution of the rungs. During execution of the SOR instruction, a predetermined register, such as a MCR register, is read causing simultaneous enabling of user interrupts which overrides the previously disabled user interrupts to allow the processor to receive an interrupt request signal. The interrupt request signal is received before the read function of the predetermined register has completed.

16 Claims, 3 Drawing Sheets

AUTOMATIC POLLING FOR USER INTERRUPTS IN A PROGRAMMABLE CONTROLLER USING RELAY LADDER LOGIC

BACKGROUND OF THE INVENTION

1. Field of the Invention

The present invention relates generally to programmable controllers of the type used in industrial automation. More particularly, the invention pertains to a method and apparatus for automatically polling for user interrupts in a programmable controller using relay ladder logic.

2. Description of the Prior Art

A programmable controller is a type of general purpose industrial computer which controls the operation of industrial or factory automation equipment or processes, such as an assembly line or a machine tool, in accordance with a stored program. The stored program includes a series of instructions or commands that direct the programmable controller to execute actions.

A typical language for programming the stored program is relay ladder logic, which is well known in the art. In general, a ladder logic program is executed from left to right and from top down to the end of the program. Each line of the ladder logic program is called a rung and contains at least one control instruction and usually contains one or more conditional instructions.

During operation, the programmable controller executes a series of operations that are performed sequentially and repeatedly. In general, this series of operations includes an input scan, a program scan and an output scan. During the input scan, the controller examines the on or off state of the external inputs and temporarily saves the status of the inputs in a memory file. During the program scan, the controller scans the instructions in the ladder logic program, uses the input status from the memory file, and determines if an output will be energized. The results of the program scan are saved to an output memory file. During the output scan, the controller will energize or de-energize its output circuits based on the output memory file to control external devices.

Each rung of a ladder logic program begins with a start of rung (SOR) instruction. While there may be additional input and output instructions combined into any particular rung, the SOR is one instruction that is guaranteed to be present at the beginning of every rung. In ladder logic, interrupts that execute as part of the user's program are only allowed to execute between rungs and not during the execution of the rung.

Heretofore, user interrupts have been controlled by disabling the interrupts when rung processing is occurring and then polling for interrupts to check to see if one has occurred. An example SOR instruction process for polling for an interrupt is depicted below in assembly code:

```
mov    R0, #InterruptRegister
jnb    R0.0, #SkipInterrupt
call   ProcessInterrupt
SkipInterrupt:
```

It is desirable to improve the operation of programmable controllers to improve their speed of operation. As will be described in greater detail hereinafter, the method and apparatus of the present invention accomplishes such a task by eliminating the need for conventional polling techniques, as described above, and employs a number of novel features that render it highly advantageous over the prior art.

SUMMARY OF THE INVENTION

Accordingly, it is an object of this invention to provide an improved programmable controller.

Another object of this invention is to provide a method and apparatus to eliminate manual polling techniques for user interrupts using an automatic polling process that provides increased processing performance due to the savings of execution time and memory space penalties incurred from manual polling.

Still another object of this invention is to provide a method and apparatus that can be employed in a cost-effective manner and is well suited for use in micro programmable controllers.

To achieve the foregoing and other objectives, and in accordance with the purposes of the present invention, a programmable controller is provided for controlling the outputs to a plurality of output devices relative to inputs. The controller includes a memory for storing a ladder logic control program having a plurality of ladder logic instruction rungs. Each of the rungs has a start of rung (SOR) instruction. A processor is coupled to the memory for executing the ladder logic control program. The processor is coupled to an I/O module for receiving inputs and sending signals to the plurality of output devices relative to the inputs. User interrupts are disabled during execution of the rungs. During execution of the SOR instruction, a predetermined register, such as the MCR register, is read causing simultaneous enabling of user interrupts which overrides the previously disabled user interrupts to allow the processor to receive an interrupt request signal. The interrupt request signal is thereby received before the read function of the predetermined register has completed.

By automatically enabling and polling user interrupts based on the read function of the MCR register, manual polling for user interrupts during the SOR function is eliminated. The elimination of this manual polling provides increased performance of the programmable controller due to faster execution and less memory access of the SOR instruction.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

In the following description, numerous specific details are set forth in order to provide a thorough understanding of the present invention. It will be obvious, however, to one skilled in the art that the present invention may be practiced without these specific details. In other instances, well-known circuits, structure and techniques have not been shown in detail in order not to unnecessarily obscure the present invention.

Figure 1:
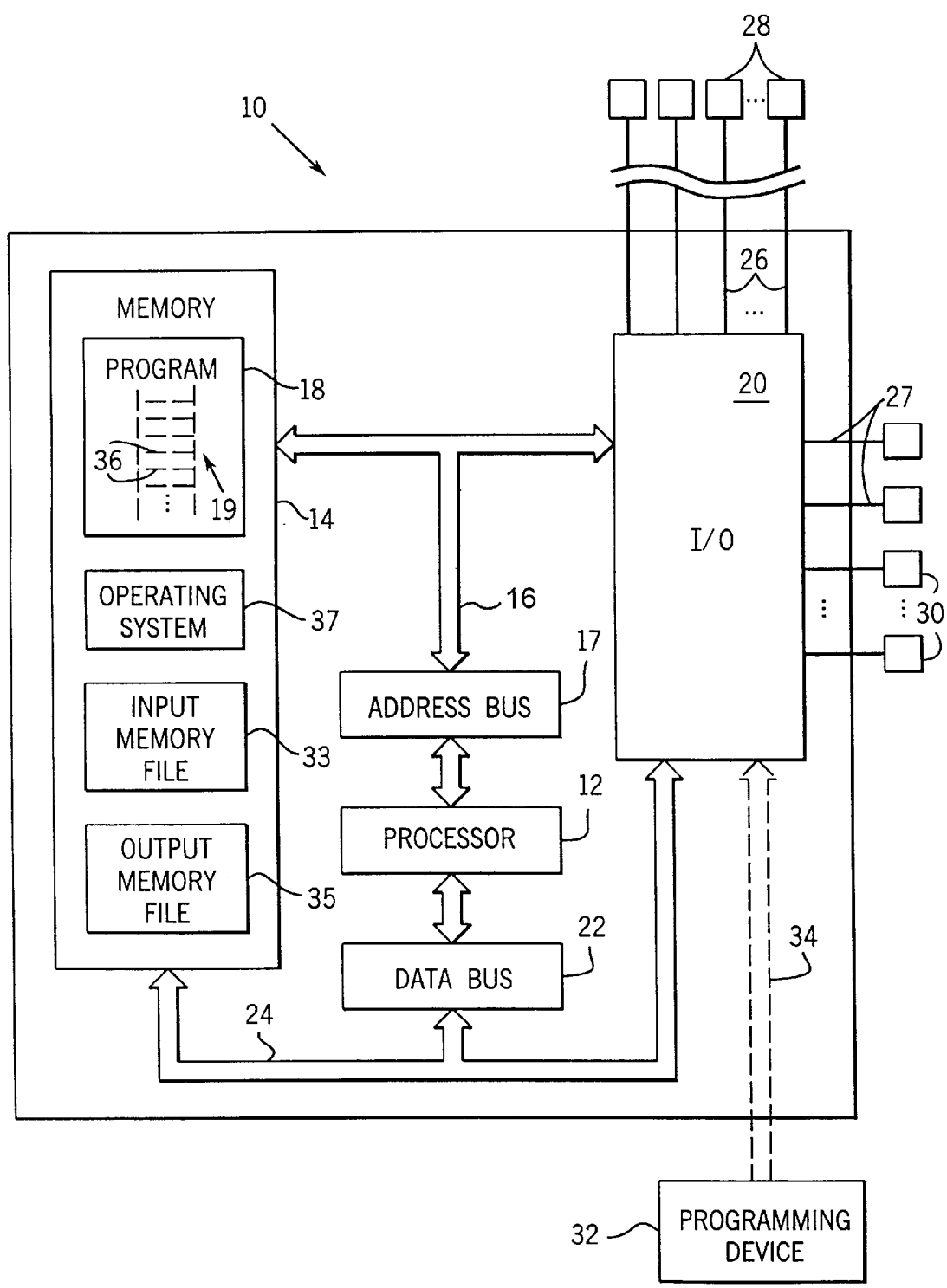
FIG. 1 is a block diagram of a programmable controller of the present invention.

Referring now to the drawings, a programmable controller 10 is illustrated in FIG. 1. The controller 10 has a processor 12 of conventional type that is connected to memory 14 via an address bus 17 through lines 16. The memory 14 is configured to hold program and data or memory files 18 including a control program 19 written in ladder logic or another control language for controlling a desired process application. The memory 14 will include RAM, ROM, EEPROM, or other volatile or nonvolatile memory storage mediums or devices, or combinations thereof, to suit a desired application and ensure proper data and program access and storage. The address bus 17 allows the processor to address specific areas in an I/O module 20 or the memory 14. A data bus 22 communicates across lines 24 to allow the processor 12, I/O module 20, or memory 14 exchange information. Input and output signals are received by the I/O module 20 by input and output lines 26, 27 respectively for connection with corresponding input components or devices 28 and output components or devices 30 of a controlled process.

A conventional programming device or industrial terminal 32 is connectable to the controller 10 through bus or lines 34 to facilitate storing and user access to the control program 18. The programming device 32 may be an independent device selectively connected to the controller 10 or may be a remote device where bus or lines 34 are communication network lines connecting the controller 10 to a network of the type known in the art.

During operation, the controller 10 executes a series of operations that are performed sequentially and repeatedly. In general, this series of operations includes an input scan, a program scan and an output scan. During the input scan, the controller 10 examines the on or off state of the external inputs 26 and temporarily saves the status of the inputs in a memory file 33. During the program scan, the controller 10 scans the instructions in the ladder logic program 19, uses the input status from the memory file, and determines if an output will be energized. The results of the program scan are saved to an output memory file 35. During the output scan, the controller 10 will energize or de-energize its output circuits based on the output memory file 35 to control external devices 30. Further, the controller 10 may be in communication with local or remote subsystems, as well as performing various error checking, diagnostic, and system functions, many of which occur through the operating system 37.

The ladder logic control program 19 includes a plurality of ladder logic instruction rungs 36, graphically depicted in FIG. 1. Since ladder logic and similar PLC control languages are well known in the art, further discussion of these languages is omitted for brevity. However, it is significant to note that each of these rungs 36 begins with a start of rung (SOR) instruction or function. While there are additional input and output instructions combined into any particular rung, the SOR is one instruction that is guaranteed to be present at the beginning of every rung. For example, the following depicts several rungs of a sample ladder logic control program:

```
SOR, XIC I1:0/3, XIC I1:0/4, OTE O0:0/2
SOR, XIO I1:0/2, XIC B3:0/7, OTE O0:0/4
SOR, ...
SOR, ...
 .
 .
 .
```

In the foregoing example, the mnemonic XIC is an input instruction referring to examine-if-closed, XIO is an another input instruction referring to examine-if-open, and OTE is an output instruction referring to output-enabled. While it should be understood there are many more input and output instructions that are combined into rungs to solve a user's particular application, the importance of this example illustrates the placement of the SOR instruction at the beginning of every rung.

In ladder logic, user interrupts that execute as part of the user's program are only allowed to execute between rungs and not during the execution of the rungs. For discussion purposes used herein, it should be appreciated that execution of the SOR instruction is not to be included as part of this rule and instead refers to the processing and rung execution occurring after the SOR functionality has completed.

In the present invention, manual polling for user interrupts as part of the SOR instruction process has been eliminated. However, the SOR instruction must process the master control relay (MCR) functionality. The MCR output instruction is used to activate or de-activate the execution of a group or zone of ladder rungs. When the MCR rung condition is TRUE, the referenced output is activated, and all rung outputs within the zone can be controlled by their respective input conditions. If the MCR output is turned OFF, all non-retentive outputs within the zone will be de-energized. It should be appreciated that while the MCR register is a predetermined register of a preferred embodiment, similar functionality within the SOR pertaining to another predetermined register or address location could equally be employed as an alternative. The assembly code for the MCR functionality, which is also part of the SOR, is depicted in the following example:

```
mov   R0, #MCR
jnb   R0.MCRbit, FalseRung
```

Figure 2:
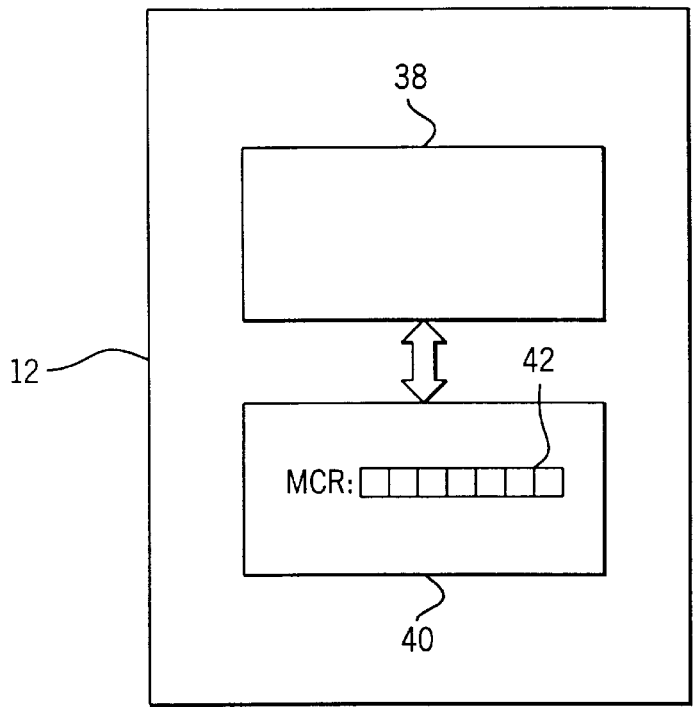
FIG. 2 is a block diagram of one embodiment of the processor shown in FIG. 1, including an MCR register according to the present invention.

In the above example, mov R0, #MCR is a read of the MCR register and jnb is a jump-on-bit command. In a preferred embodiment, the processor 12 includes a microprocessor 38 and an ASIC 40 operatively coupled together as illustrated in FIG. 2. However, it should be understood that other microprocessor and integrated circuit implementations could be used. In the preferred embodiment above, the ASIC contains the MCR register depicted by the numeral 42.

Figure 3:
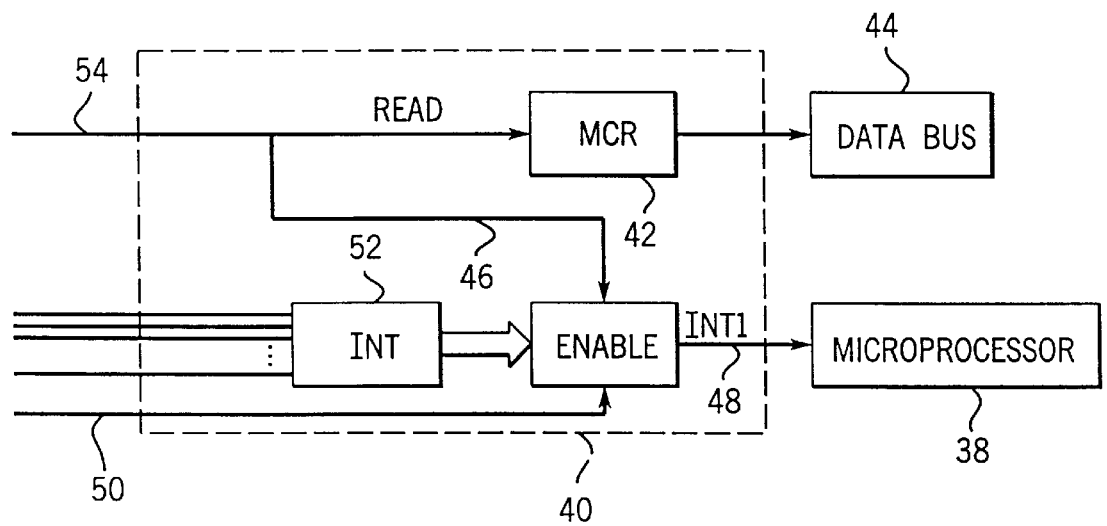
FIG. 3 is a diagram of the processor of FIG. 2 enabling user interrupts.
Figure 7:
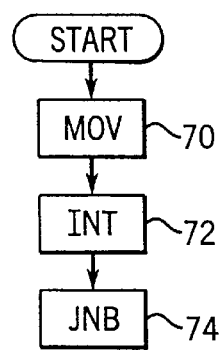
FIG. 7 is a flow diagram of the MCR functionality of a preferred embodiment of the present invention.

Referring to FIG. 3, the ASIC 40 responds to the read request of the MCR register 42, shown at signal line 54, by placing the MCR data on the data bus. While it is responding to the read request, the ASIC 40 also enables the user interrupt signal on line 46. After the data has been placed on the data bus, the ASIC then disables the user interrupts. By the time the processor finishes the read operation, the interrupt signal 48, which has been latched by the microprocessor, is requesting service. FIG. 7 illustrates the process flow of the MCR functionality where the read occurs at step 70, the interrupts, if any, are processed at step 72, as later described in more detail, and the MCR functionality completes at step 74.

The general operation of the automatic polling feature of the present invention begins with a disabling of user interrupts. For example, in one embodiment where the microprocessor 38 is a Philips 80C51-XA microprocessor this step would be accomplished by setting the INT 1_DISABLE bit of the INTERRUPT 1 DISABLE REGISTER, illustrated in FIG. 3 at signal line 50. This disables all interrupts 52 associated with the external 1 interrupt of this microprocessor. If the interrupt source asserts the interrupt signal, it will be blocked by the ASIC thus preventing the microprocessor from being notified of the request. However, it should be appreciated that disabling and enabling of user interrupts as well as certain nomenclature may vary between different microprocessors.

As previously discussed, the MCR register 42 is read by the microprocessor at the start of the processing of each rung in the user ladder logic control program. The ASIC will decode the address and read request of the microprocessor and will determine that a valid read operation of the MCR register is taking place. While the read signal is active during this operation, the ASIC will override the state of the INT 1_DISABLE bit and allow any active interrupt signals to cause the assertion of the INT 1 input 48 of the microprocessor 38.

Figure 4:
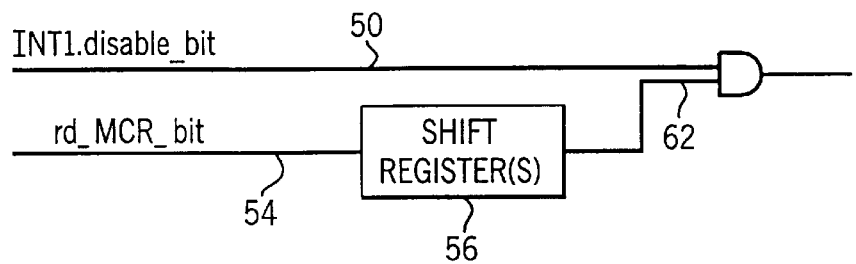
FIG. 4 is a block diagram of a shift register for one embodiment.
Figure 5:
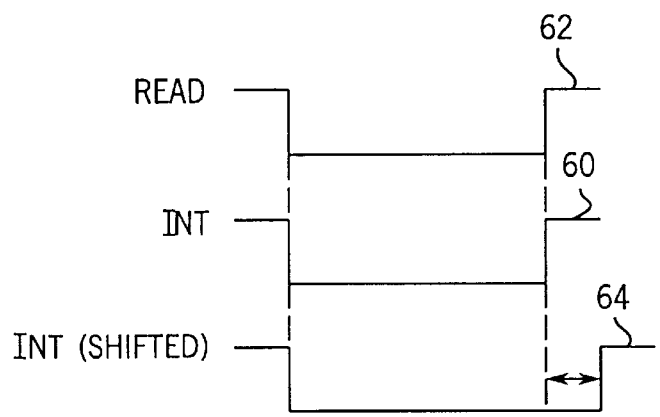
FIG. 5 is a timing diagram showing the signal lengths resulting from use of the shift register of FIG. 4.

The ASIC assures the duration of the interrupt signal to the microprocessor is sufficient to allow the microprocessor to recognize it is active. For some microprocessors, such as the Philips 80C51-XA, the interrupt signal may need to be lengthened to ensure that the microprocessor will have enough time to recognize it. Referring to FIG. 4, an alternative embodiment is provided which would be implemented within the ASIC whereby a shift register process 56 or series thereof is used to stretch the signal. Referring to FIG. 5, the interrupt signal 60, having a starting length the same as the read signal 62, is processed through the shift register into a lengthened signal 64.

Figure 6:
FIG. 6 is a logic diagram showing the interrupt request signals.

At the end of the read operation, the INT 1_DISABLE bit is allowed to disable the associated interrupt signals which removes the interrupt signal from the microprocessor. The microprocessor can detect that its interrupt input was active and can process any of the interrupts it is programmed to service after completing the read operation of the MCR register, as previously shown at step 72 of FIG. 7. Referring to FIG. 6, the interrupt request signals 66 of a preferred embodiment are logically processed within the ASIC with an OR operator to provide a single signal INT 1 68 indicating a user interrupt. When processing the user interrupts, the microprocessor can check the interrupt enable and status bits to determine the particular interrupt.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A programmable controller for controlling the outputs to a plurality of output devices relative to inputs, comprising:

memory means for storing a ladder logic control program having a plurality of ladder logic instruction rungs, each of said rungs having a start of rung function;

processor means coupled to the memory means for executing the ladder logic control program, the processor means coupled to an I/O module for receiving inputs and sending signals to the plurality of output devices relative to said inputs, the processor having means for disabling user interrupts during execution of said rungs; and means for reading a predetermined register while simultaneously enabling user interrupts causing an overriding of said means for disabling user interrupts to allow the processor means to receive an interrupt request signal until the time the predetermined register has completed being read.

2. The programmable controller of claim 1, wherein the predetermined register is a MCR register.

3. The programmable controller of claim 2, wherein the processor means includes a microprocessor and an ASIC operatively connected therewith.

4. The programmable controller of claim 3, wherein the MCR register is located on the ASIC.

5. The programmable controller of claim 4, wherein said start of rung function includes a MCR function and wherein said means for reading a predetermined register while simultaneously enabling user interrupts occurs and completes during execution of said MCR function.

6. The programmable controller of claim 4, wherein the ASIC includes a shift register for receiving and extending the length of the interrupt request signal.

7. The programmable controller of claim 1, wherein said means for reading a predetermined register while simultaneously enabling user interrupts occurs in said processor means during execution of said start of rung function.

8. Method for providing automatic polling for user interrupts on a programmable controller having a ladder logic control program, the ladder logic control program having a series of rungs, each of said rungs beginning with a start of rung function, the method comprising the steps of:

disabling user interrupts during execution of said rungs of the ladder logic control program; and reading a predetermined register of the programmable controller while simultaneously and momentarily enabling a user interrupt signal processed on the controller causing an overriding of said step of disabling user interrupts to allow a processor of the programmable controller to receive an interrupt signal request before the step of reading the predetermined register has completed.

9. The method of claim 8, wherein the predetermined register is a MCR register.

10. The method of claim 8, wherein said step of reading a predetermined register of the programmable controller includes the step of checking for a read of the predetermined register to actuate a signal causing the enabling of the user interrupt signal.

11. The method of claim 8, wherein said step of reading a predetermined register while simultaneously and momentarily enabling user interrupts occurs during execution of said start of rung function.

12. The method of claim 8, wherein said start of rung function includes the step of reading the predetermined register causing the simultaneous enabling of user interrupts.

13. The method of claim 12, wherein the start of rung function includes a MCR function.

14. The method of claim 8, further comprising the step of extending the length of the interrupt request signal by using a shift register.

15. The method of claim 8, further comprising setting the interrupt request signal by receiving a series of interrupt signals and enabling the interrupt request signal when any one of said series of interrupt signals has been enabled.

16. The method of claim 8, further comprising the step of executing the user interrupts before completing the start of rung function.

* * * * *